(12) United States Patent
Van Tol et al.

(10) Patent No.: US 10,262,368 B2
(45) Date of Patent: Apr. 16, 2019

(54) APPARATUS, DATA BASE SYSTEM AND COMPUTER PROGRAM PRODUCT FOR TRADING FINANCIAL INSTRUMENTS

(71) Applicant: Huddlestock Capital AS, Stavanger (NO)

(72) Inventors: Michel Van Tol, Reykjavik (IS); Murshid Mikael Ali, Stavanger (NO)

(73) Assignee: Huddlestock Capital AS, Stavanger (NO)

( * ) Notice: Subject to any disclaimer, the term of this patent is extended or adjusted under 35 U.S.C. 154(b) by 819 days.

(21) Appl. No.: 14/474,243

(22) Filed: Sep. 1, 2014

(65) Prior Publication Data

US 2016/0063622 A1 Mar. 3, 2016

(51) Int. Cl.
*G06Q 40/04* (2012.01)
*G06Q 40/06* (2012.01)

(52) U.S. Cl.
CPC ............ *G06Q 40/04* (2013.01); *G06Q 40/06* (2013.01)

(58) Field of Classification Search
CPC ......... G06Q 40/04; G06Q 40/06; G06Q 40/00
See application file for complete search history.

(56) References Cited

U.S. PATENT DOCUMENTS 7,110,974 B1 * 9/2006 Rust ..................... G06Q 40/025
 705/37
7,165,045 B1 * 1/2007 Kim-E ................... G06Q 40/00
 705/35

(Continued)

FOREIGN PATENT DOCUMENTS

WO 00/70506 A1 11/2000
WO WO-0070506 A1 * 11/2000 ............. G06Q 40/04

OTHER PUBLICATIONS

Kluger et al.: Intraday Trading Pattern in an Intelligent Autonomous Agent-Based Stock Market, May 3, 2009, Miami University, pp. 1-47. (Year: 2009).*

(Continued)

*Primary Examiner* — Bijendra K Shrestha
(74) *Attorney, Agent, or Firm* — Renner, Otto, Boisselle & Sklar LLP

(57) ABSTRACT

An apparatus (100) for proprietary trading financial instruments (F1, F2) in a financial trading system (20) of at least a first trading agent (A1) providing at least first financial instrument (F1) and a second trading agent (A2) providing at least a second financial instrument (F2) and a crowd of trading customers (TC), which apparatus (100) further comprises a monitoring unit (130) configured to automatically monitor opportunities to perform proprietary trading in said trading system (20) based on a plurality of systematic strategies running over the plurality of trading agents and financial instruments and based on behavioral patterns emerged by interaction of individual long- or medium term trading, and further comprising an automated trading unit (180) configured to automatically control multi-agent trading of the plurality of trading agents (A1, A2) and the plurality of financial instruments (F1, F2), wherein the trading unit (180) is configured to automatically provide a time frame (TF) within which the crowd of clients (23) are offered to trade collectively thereby founding the trade in collectively automatically based on the behavioral patterns. An advantage is that the various embodiments of the present disclosure will contribute to change this rigid structure in the favor of those customers/investors with less knowledge about the financial markets.

5 Claims, 3 Drawing Sheets

(56) References Cited

U.S. PATENT DOCUMENTS

| | | | | |
|---|---|---|---|---|
| 7,945,502 B2* | 5/2011 | Mashinsky | ............ | G06Q 40/00 |
| | | | | 705/35 |
| 8,156,035 B2* | 4/2012 | Ferguson | ............... | G06Q 20/10 |
| | | | | 705/35 |
| 8,392,318 B2* | 3/2013 | Bhat | ...................... | G06Q 99/00 |
| | | | | 705/37 |
| 8,577,772 B2* | 11/2013 | Heckman | ............... | G06Q 40/00 |
| | | | | 705/36 R |
| 2002/0032630 A1* | 3/2002 | Peng | ..................... | G06O 40/04 |
| | | | | 705/36 R |
| 2003/0055776 A1* | 3/2003 | Samuelson | ............ | G06Q 40/04 |
| | | | | 705/37 |
| 2007/0136173 A1* | 6/2007 | de Hoog | ................ | G06Q 40/04 |
| | | | | 705/36 R |
| 2009/0182624 A1* | 7/2009 | Koen | .................... | G06Q 10/10 |
| | | | | 705/37 |
| 2010/0241588 A1* | 9/2010 | Busby | ................... | G06Q 40/00 |
| | | | | 705/36 R |
| 2013/0060672 A1* | 3/2013 | Assia | ..................... | G06N 5/025 |
| | | | | 705/37 |

OTHER PUBLICATIONS

Kelley et al.: How Wise are Crowds? Insights from Retail Orders and Stock Returns, Jan. 2012, pp. 1-85 (Year: 2012).*
International Search Report and Written Opinion for corresponding Patent Application No. PCT/EP2015/069863 dated Dec. 17, 2015.

* cited by examiner

APPARATUS, DATA BASE SYSTEM AND COMPUTER PROGRAM PRODUCT FOR TRADING FINANCIAL INSTRUMENTS

TECHNICAL FIELD

The present invention relates to an apparatus, data base system and computer program product for trading financial instruments, in particular for proprietary trading.

BACKGROUND

Retail investors/traders tend to be at a distinct disadvantage when compared to financial market professionals because they have less access to price-sensitive information and they are, on average, less capable of understanding the impact of specific information on a stock's price. As a result, many use financial advisors that often charge high commissions for the services they provide.

Modern trading systems are also typically complex, interactive and dynamic needing to be able to adapt to changing market conditions that are only partially governed by economic fundamentals and hence not directly useable for retail investors/traders.

Thus, there is need for a financial trading system that is able to provide also retail investors/traders to be able to benefit from modern systems, or other proprietary trading systems.

SUMMARY

According to an aspect of the present disclosure, there is provided a complex artificial (virtual) proprietary trading platform based on a multi-agent approach. This implies providing an advanced trading platform that trades automatically when it detects "windows" or opportunities for financial gain for a crowd of users to trade. This allows a group of users to invest in the same trade and by doing so allows them to reduce trading costs, confirm with others in the 'huddle' that the idea is worth investing in and have fractional ownership of shares. This trading platform is embodied as an apparatus, data base system and computer program product for proprietary trading financial instruments.

Herein, the term "proprietary trading" includes collectively trading as performed by holding companies.

It is an object of the present invention to provide an apparatus and a data base system for trading financial instruments, which obviate the above mentioned drawbacks, in particular as regards those investors/traders with less knowledge about the financial markets.

The above stated object is achieved by means of an apparatus, data base system and computer program product according to the independent claims and by the embodiments according to the dependent claims.

According to an embodiment of the present disclosure, there is provided an apparatus for proprietary trading financial instruments in a financial trading system of at least a first trading agent providing at least a first financial instrument and a second trading agent providing at least a second financial instrument and a crowd of client computers; the client computers being used by, or configured to be used by, customers/investors/traders. The apparatus further comprises a monitoring unit configured to automatically monitor opportunities to perform proprietary trading in said trading system based on a plurality of systematic strategies running over the plurality of trading agents and financial instruments based on behavioral patterns emerged by interaction of individual long- or medium term trading. The apparatus further comprises an automated trading unit configured to automatically control multi-agent trading of the plurality of trading agents and the plurality of financial instruments. The trading unit is configured to automatically provide a time frame within which the crowd of client computers are offered to trade collectively thereby founding the trade collectively and automatically based on the behavioral patterns.

According to an embodiment of the present disclosure, the apparatus can be embodied as a database platform, and in particular one that is scalable from the perspective of it having the ability to include new trading strategies. These strategies can be run concurrently and potentially be run by third party strategy vendors.

According to an embodiment of the present disclosure, there is provided a data base system for proprietary trading financial instruments. The data base system comprises an apparatus as disclosed above, a plurality of client computers, each client computer having installed thereon an application program, the application program comprising client computer (and/or user specific) specific log-in information, and an interface for communication with the crowd of client computers.

According to an embodiment of the present disclosure, there is provided a computer program application product (APP), comprising instructions, that are executable by a client computer. The computer program product is an application program for proprietary trading financial instruments, being operational to perform the following steps for receiving and writing a data item to the data base system:

receiving a time frame within which the crowd of client computers are offered to trade collectively thereby founding the trade collectively and automatically based on the behavioral patterns, transmitting a response to the offer to trade.

An advantage of certain embodiments of the invention described herein is that they can easily be implemented to operate with existing financial trading systems providing financial trading infrastructure. Because of that, trading will typically be non-expensive, and may be performed by individual customers trading collectively which is not possible to achieve in today's advanced trading systems for trading financial instruments.

Another advantage is that the various embodiments of the present disclosure will contribute to change this rigid structure in the favor of those customers/investors with less knowledge about the financial markets.

Another advantage is that the various embodiments of the present disclosure will achieve desired trading profit from the whole system by using behavioural patterns that will emerge by interaction of a large amount of small individual long- or medium term trades from non-robotic systems.

Further advantages and features of embodiments of the present invention will become apparent when reading the following detailed description in conjunction with the drawings.

DETAILED DESCRIPTION

Embodiments of the present disclosure will now be described more fully with reference to the accompanying drawings. Examples of embodiments of the invention are described and these examples of embodiments are provided so that this disclosure will be thorough and complete and are not for the purposes of limitation.

Figure 1:
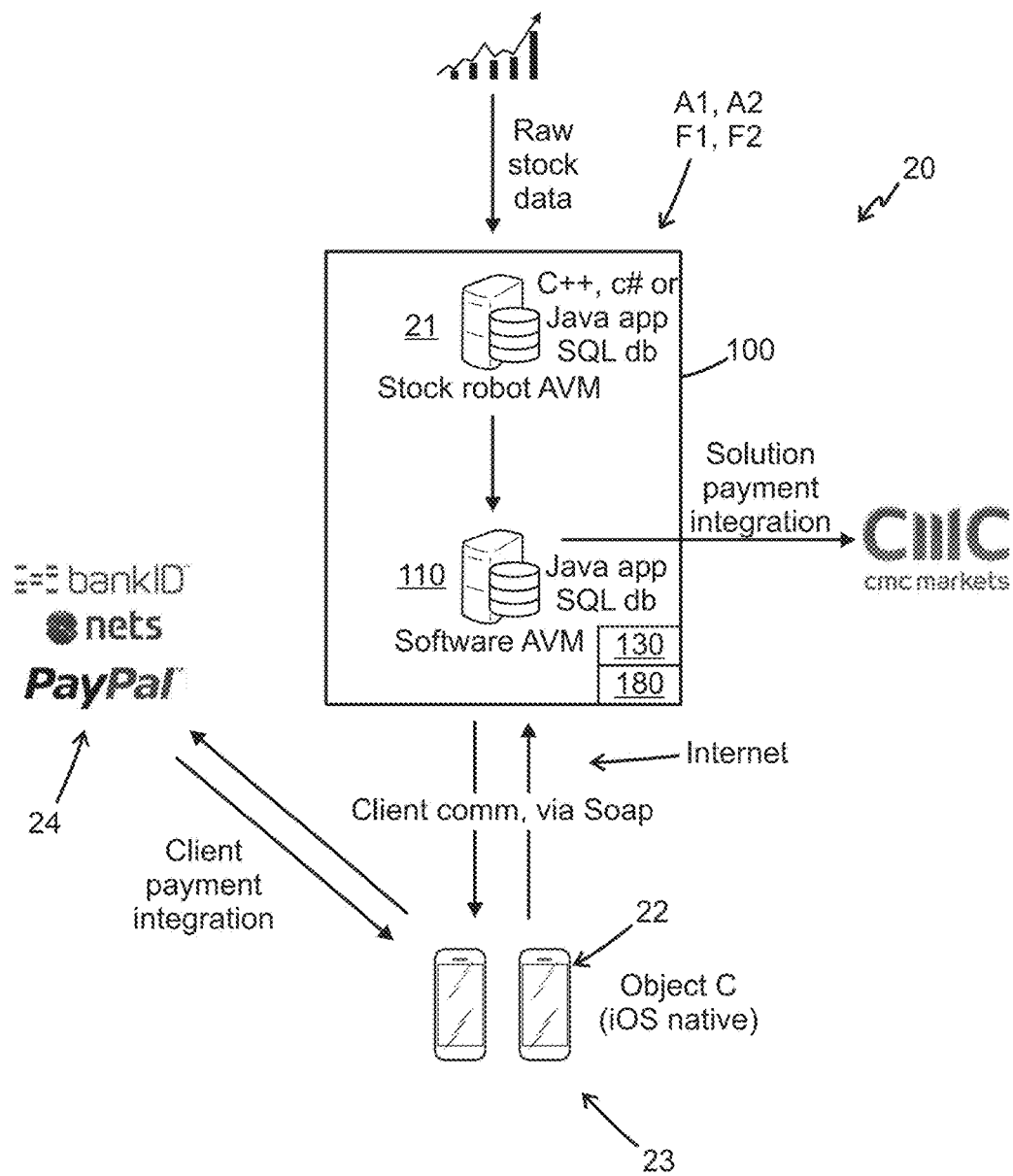
FIG. 1 is a schematic block diagram of an apparatus for trading financial instruments, in a data base trading system, according to an embodiment of the present disclosure.

In FIG. 1, a schematic block diagram of an apparatus 100 proprietary trading financial instruments F1, F2 in a financial trading system 20 of at least a first trading agent A1 providing at least first financial instrument F1 and a second trading agent A2 providing at least a second financial instrument F2 and a crowd of client computers 23 according to an embodiment of the invention is shown.

A trading system 20 usually consists of a number of remote user terminals, all connected to a central computer server system comprising a matching unit for matching orders, a memory for storing software for application of the trading system and order books. The remote user terminals send data to and receive data from a central computer server system, for instance to give an order to trade and to receive information about the order that have been traded. Of course also other information, for instance market data, information to a clearing house, may be exchanged between the user terminals and the central computer server system. The trading system 20 per se can be implemented by a computer executing software for financial trading systems. This part of the trading system can be implemented in a Quantitative Trading Operations/Trading system 21, which can be provided by any conventional trading system.

The apparatus 100 further comprises a monitoring unit 130 configured to automatically monitor opportunities to perform proprietary trading in said trading system 20 based on a plurality of systematic strategies running over the plurality of trading agents and financial instruments and based on behavioral patterns emerged by interaction of individual long- or medium term trading. The apparatus 100 further comprises an automated trading unit 180 configured to automatically control multi-agent trading of the plurality of trading agents A1, A2 and the plurality of financial instruments F1, F2. The trading unit 180 is configured to automatically provide a time frame within which the crowd of trading client computers 23 is offered to trade collectively thereby founding the trade in collectively automatically based on the behavioral patterns.

The apparatus 100 is typically configured to provide an approval process for each client 23 and customer account. The apparatus 100 is typically configured to push a notification to a set of client devices 23 for offering a trade.

Each client computer 23 has installed thereon an application program comprising client computer specific log-in information. The system 20 further comprises an interface 22 for communication with the crowd of client computers 23.

According to embodiment, there is provided a computer program application product APP, comprising instructions, that are executable by a client computer 23, the computer program product being an application program for proprietary trading financial instruments, the application program being operational to perform the following steps for receiving and writing a data item to the data base system 20:

receiving a time frame within which the crowd of client computers 23 are offered to trade collectively thereby founding the trade collectively and automatically based on the behavioral patterns, transmitting a response to the offer to trade.

The computer application program product can be provided for receiving and transmitting data for an approval process, and receiving a push notification for offering a trade.

For the sake of ease of illustration, gateways, interfaces and data lines between users of the trading system and the trading system are not illustrated since they are of conventional types and are not the subject of the present disclosure.

The embodiments of the present disclosures rely on systematic trading strategies that detect trading opportunities. These opportunities are wrapped as investment ideas and sent to a random group of customers/user's smart client computer devices 23 via a dedicated computer application product (abbreviated "app") which gives them a 'decision period' to decide whether to take part in the idea. Once a user decides a) to trade and b) the size of their contribution then, when the 'decision period' has expired, the contributions of the crowd are aggregated and the trade is executed on behalf of the group.

Typically, the system 20 comprises the apparatus 100 for proprietary trading, a trading system 21 and a user-friendly interface (not shown in this figure). These components may consist of several sub-components.

In accordance with embodiments of the present disclosure some or all of the client computers are located outside an access protected trusted environment. For example, at least some of the client computers are portable client computers are portable electronic telecommunications devices such as mobile radios or digital cellular mobile telephones, such as smartphones or tablet computers that have a communication interface, such as a GSM, UMTS, WLAN or other network interface.

The system provides a real-time system that allows groups of people to take part in sophisticated investment strategies via small contributions to individual investment ideas (crowd trading).

Each component will evolve incrementally so as to dovetail the needs of the users with those of the trading strategies generating the investment ideas. Trading-off these needs is both complex and innovative. Getting the trade-off right will lead to a scalable solution and, from the users perspective, a cutting-edge product/service.

The idea behind crowd trading is similar to that of crowdfunding—where a large number of small investors back specific projects. In crowd trading, a large number of small investors invest in an investment idea that has been generated by a specific trading strategy (which is hosted by the trading system).

The data base system as an example, outside of the front-end, can be coded in Matlab and utilises a MySQL database as well as third-party APIs and software. The user-interface only interacts with two components of the system: the database and the user's accounts (via a security layer).

Various embodiments of the present disclosure can be integrated into a simple user-friendly computer application product, i. e. a so-called "app" that can be downloaded and installed on client computer 23 such as a wireless communication device such as a smart device, in particular a smart phone. After registration is achieved, via a minimal number of steps, a user will have access to the apparatus 100 and/or system 20 in a 'demo version'. This means that the user now has access to the stream of investment ideas generated by the trading system. Various settings will be applied to assist in managing this stream to suit a user's specific requirements. In achieving this we will have removed the barrier that currently exists between consumers and sophisticated investment strategies. Switching from a 'demo version' to the full product entails creating an account, depositing money on the account and saying 'yes' to investment ideas.

By means of various embodiments of the present disclosure an advantage is that retail investors will have access to investment ideas generated by the kinds of trading systems utilized at hedge funds, proprietary trading firms and other sophisticated investment companies. Scale will be achieved by having users huddle together in groups. The architecture of the system allows for millions of users worldwide trading in stocks across numerous venues.

The various embodiments of the present disclosure intend to level the playing field by presenting investment ideas without charging exorbitant commissions when a user chooses to exploit them.

The various embodiments of the present disclosure will allow its customers to engage in "crowd trading". Herein this disclosure, "crowd trading" allows a group of users via their client computers to invest in the same trade and by doing so allows them to reduce trading costs, confirm with others in the 'huddle' that the idea is worth investing in and have fractional ownership of shares.

Continuous research in the trading systems on which the various embodiments of the present disclosure is based ensures constant attention to maximizing the profitability of individual trades. A trade may constitute a number of positions executed simultaneously, for example a long and a short idea that have been tailored and paired based on statistical grounds.

The development of this technology is typically possible due to advancements in both automated trading systems, and the increased popularity of easy-to-use technological tools such as apps- and interactive websites. The system will be built on a highly scalable platform, in multiple languages, that will allow customers to trade any asset worldwide.

Figure 2:
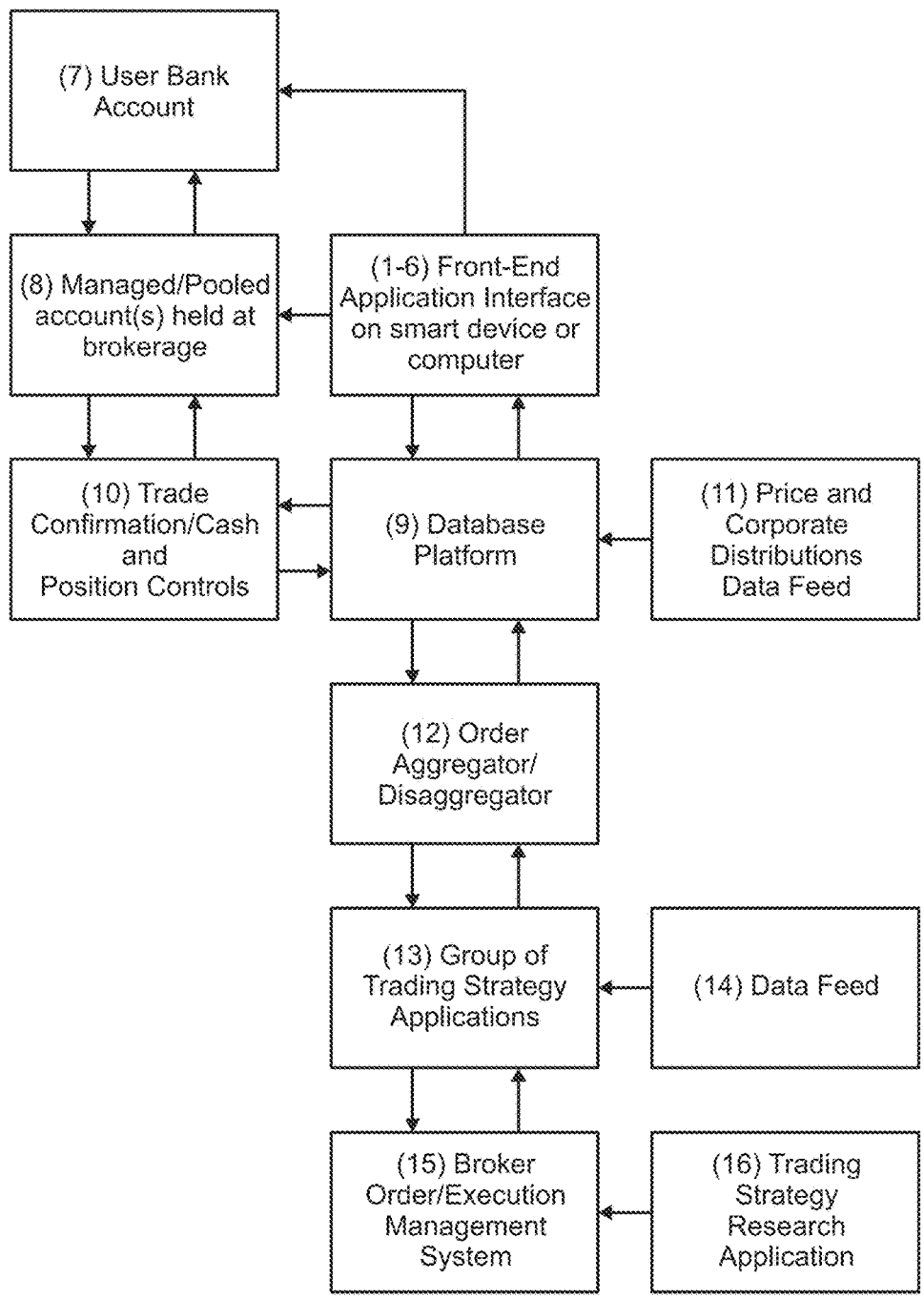
FIG. 2 is a flowchart for the system according to an embodiment of the present disclosure and FIG. 3 is a flowchart for the user interface of the computer application product of the client device according to an embodiment of the present disclosure.

Now an example of how a trade is handled by the apparatus, data base system and app according to embodiments of the present disclosure will follow with reference to FIG. 2, which is a flowchart for the system according to an embodiment of the present disclosure.

1-6 User Interface

This will be described as follows.

7 User Bank Account

When a new user sets up an account with the system, a new managed account on behalf of the user at a brokerage company (in the case of managed accounts) or will not do so in the case of a pooled account is set up 7.

Once the brokerage account is set up the user-interface can be used to transfer money from a user bank account to their brokerage account.

8 Managed/Pooled Account

The user-interface can be used to send a withdrawal instruction to the brokerage company. Money can only be transferred back to the same bank account that was used when the brokerage account was set up (in the case of managed accounts) 8. In the case of a pooled account an offline system will be used to confirm the exactness of the requested redemption before any money is released to a user's bank account.

Security layers will be in place to flag any extraordinary movement of money.

9 Apparatus (Database Platform)

The apparatus 100 (as shown in FIG. 1), which can be embodied as a database platform as shown in FIG. 2), is both a data repository and a transmission mechanism managing the interaction between the front-end and the group of trading strategy applications 13 (via the order aggregator/dis-aggregator). As a data repository it will hold account details/histories, order details/histories, position details/histories, user preferences, etc. as a transmission mechanism it will signal to listeners on the front-end that a new investment idea has been generated and that a randomised subset of the user base needs to be notified. Importantly, all information required to do a full audit of any account/trade on behalf of a regulatory authority will be stored.

10 Trade Confirmation/Cash and Position Controls

Each trade done on behalf of a huddle of user's needs to be checked for accuracy both in terms of quantity and price, and cross-validated with the executing broker. This is a process that can largely be achieved using automated processes to identify outliers. Outliers will need to be dealt with manually as usually they indicate an error of some sort on either side of a specific transaction. Corporate distributions that occur when a specific share is owned by a huddle of users also need checking and cross-validation with the broker.

11 Price and Corporate Distributions Data Feed

In order to be able to provide current and historical account values to our users we need to have both historical and current share prices in the database. Positions that are held when the stock is subject to a corporate distribution (stock split, cash dividends, rights issue, etc.) require that we hold relevant information in the database—this data is needed when computing historical account values as well.

12 Order Aggregator/Dis-aggregator

After an investment idea has been pushed through to the front-end interface and once all the responses have been collected from the users they are aggregated before the order is routed to the Broker OMS/EMS (via a trading strategy application). Once the order has been executed it needs to be disaggregated on a pro rata basis in accordance with the contributions of each user. In doing so there is allowed for fractional ownership of shares (for example a user may have contributed 25NOK to an idea in a stock that cost 100NOK, then that user is allocated 0.25 shares).

13 Group of Trading Strategy Applications

Trading strategy applications are complex sets of algorithms that are used to find potentially profitable trading opportunities within a universe of tradable assets. Typically, these strategies comprise a number of sub-components including stock selection, entry and exit algorithms. They can have intricate mathematical formulae governing dynamic hedging processes and portfolio rebalancing techniques.

Trading strategies typically attempt to capture a unique source of alpha (i.e. risk-adjusted return) as a result there are very many different approaches that can be taken. By way of illustration one trading strategy can be based on price momentum (i.e. buy after observing that a stock price has gone up in the expectation that it will continue to do so) another trading strategy can be based on convergence (i.e. when observing a price difference between two assets that are sufficiently similar as to not explain the difference in price one would expect the prices of the assets to converge—in this case you could go long one asset and short the other). Indeed, any number of combinations of the two approaches is also possible.

Each strategy that is developed will be subjected to a set of constraints unique to the crowd trading concept (for example the need to provide a 'decision period' before executing the trade is a constraint that needs to be explicitly taken into account during strategy development/evaluation).

14 Data Feed

The group of trading strategy applications will require a set of data feeds. These are a function of the types of strategies that belong to the group. Required data can span fundamental company data (like balance sheets or income statements), dilution data, ratios on the likelihood of bankruptcy, pricing data related to other asset classes (for example commodities and CDS's), (customised) index data, currency and other macroeconomic data, catalysts (like rumours, M&A announcements/speculation, insider buying, management changes, etc.). Live data will be required for the live trading strategy applications whereas historical data will be required for researching trading strategies (prior to their going live).

15 Broker Order/Execution Management System

The broker order/execution management system (oms/ems) 210 is third party software that allows one to submit trades to a broker that are then routed to various exchanges (via routing algorithms) for execution. Specific instructions can be attached to each order which influence when and at what price orders should be executed. Most ems software packages will allow you to attach a complex set of instructions on how the position should be exited as well.

16 Trading Strategy Research Application

Before a trading strategy is allowed to produce investment ideas for the user base they are subjected to rigorous evaluation and testing. This module entails a back-testing system that allows you to simulate the performance of a particular trading strategy by running simulations over historical data. Before a strategy can go live numerous checks on the strategy are carried out relating to performance, reliability, economic sensibility, robustness, etc. Only when a strategy meets these criteria will it be considered for use in the live trading environment (where it will be allowed to suggest investment ideas to the users via the front-end interface). This research module needs access to the same data (if not more) that is required by the group of live strategies. There is also an intermediate step between a strategy having back-tested successfully and going live and that is to engage in simulated trading or 'paper-trading', in a live environment (hence the connection between this module and the broker oms/ems).

Apparatus User Interface specifications

The interface can be built using existent technological solutions within the web 2.0/3.0 segment. It utilises well known languages such as Python, Objective-C, Pluss CSS, HTML, Java etc. All functionality built into the interface is typically proprietary i.e. does not rely on existent platforms such as word press. This is to ensure that it fits with security protocols used and allows maximizing control over the system.

Figure 3:
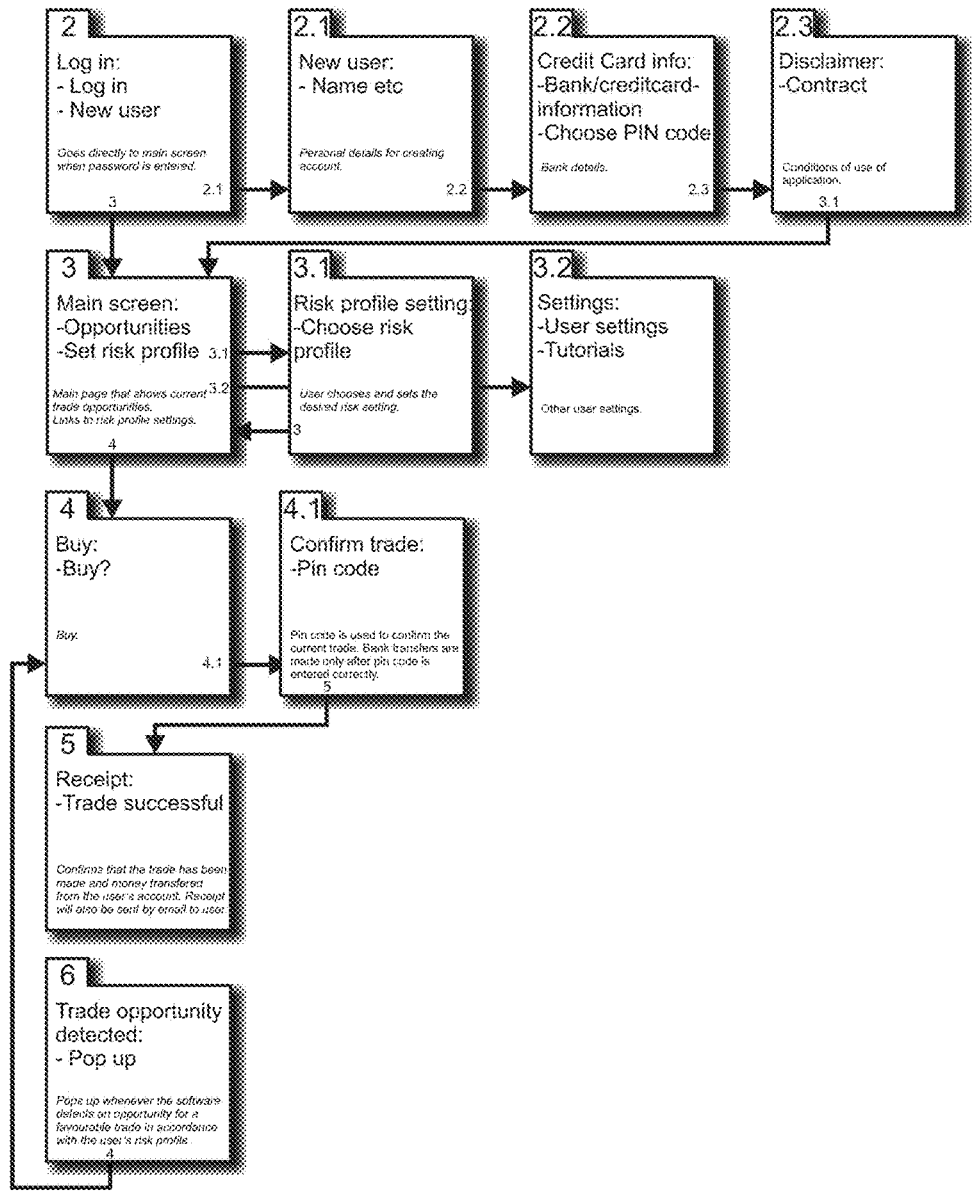

Now is referred to FIG. 3 which is a flowchart for the user interface of the computer application product of the client device according to an embodiment of the present disclosure.

1. In-coming Screen

The interface can be constructed on the basis of incremental innovation and user-accepted designs. It is essential for the apparatus that the system is as convenient as possible for its customers. Through the website users could gain access to others score or ratings. This allows users to create competitive environments and a social component to the apparatus. This function can be investigated and developed based on feedback from test-groups.

2. Login Function

Login using simple username and password given during registration.

The apparatus 100 connects the device/user to the database platform through the API. Connection is given after the user registers information via the application on the mobile device, tablet or computer. Each account may need to go through an approval process (some of which can be automated). Information is recorded in the database platform 100.

2.1 New User

New users register easily by entering name, birthdate and email address. Users might also be able to register quickly through various social media platforms. Information is recorded in the database platform 100. By default, GPS coordinates will be used to assign strategy/stock exchange subscriptions.

2.2 Payment Information

Users enter their credit card details. Credit card details and information are automatically matched to their phone number, bank and user details given in step 2.1. Verification email is sent to given email address. A link in this email must be verified to identify the user.

Once verified the user receives a unique PIN-code by SMS that will be used each time the user trades, through the security check in step 4.1. When the account is set-up users can pay money into the account using standard methods like PayPal, credit/debit card, or money transfer. It is important that any money coming into the account from a particular source can only be transferred back to that same source (i.e. the system 20 cannot accept money from one account and then pay it out in another—this is for money laundering/tax avoidance purposes). Data is read and written to the database platform 100.

2.3 Disclaimer

The disclaimer informs each user of the risks, fair use policy, regulations and other terms and conditions governing the use of the system 20.

3. Main Screen (Working Screen)

Real-time trading screen is directly connected to the apparatus, herein database platform 100. Includes data transport: Internet, telecom and other data transporters. Gathers available information such as:
  a. Time
  b. Date
  c. Device type
  d. Location
  e. Trading opportunity From time to time they will receive a push notification via the app asking them whether they want to participate in a live investment opportunity and to what extent. High capacity trading (HCT) will provide them with some information on the investment idea without being overly specific (this is a necessity to avoid being picked-off by other market participants when executing the trade).

3.1 Risk Profile Screen

Here the user can choose strategy and risk profile. Risk profile will be categorised in 3: Low risk, medium risk and high risk. This interface is linked with the database platform. The screen should also present them with the value of their accounts (updated every 5 minutes say) including the value of their live investments.

3.2 Further User Settings

In this screen the user can check their available balance/invested funds from the database and present them with incremental participation options (i.e. 100NOK, 250NOK, 500NOK, etc.).

4. Buy: Yes or No, Screen

The trading screen is simple and will present two options for each trade: Yes or No. In addition there will be a small info button available. The Info button allows traders to get more information about which sector the trade is in, if it is a long or short trade etc. Selecting the 'Yes' button allows the user to invest through the crowd trading function. By selecting 'No' the user confirms that they do not want to participate in a certain trade.

There is a set window of time within which crowd-traders must have agreed to take part in an investment idea. This window can change in length because the investment idea may become less attractive during the waiting period (period between identifying the opportunity and execution of the trade on the exchange). So we will reserve the right to cancel an investment opportunity if the situation changes. During this waiting period HCT need to define different sub-periods/criteria to monitor whether the investment idea is still viable.

The App is driven by changes in data/tables in the underlying database. The trading operations have access to this database and can pull relevant information (for example how much money has been collected for a specific investment idea) but will also need to write to the database for example information related to disaggregated trades.

4.1 Confirm Trade: Security

Enter pin-code to continue and allow for the app to execute the trade. The pin-code received is the same given to the user during registration/login at stage 2.1.

5. Executed Trade

Receipts/trade confirmations will be provided via the users account page on a website. The details of every trade is saved both in a log in the database and in the broker order/execution management system.

6. Buy/Pop-Up Screen

Goes back to screen 3 in expectation of new investment ideas.

EXAMPLES

| | Real life application | |
|---|---|---|
| | Example/Scenario 1 | Example/Scenario 2 |
| Person, whereabouts and intentions | Joey is an amateur investor. He is 22 years old and studies Economics. He is interested in the stock market, but finds it difficult to learn and make a profitable trade. He hears about Huddlestock and downloads it on his mobile device. | Cecilia is a retired engineer. She is interested in learning more about the financial markets and how to invest. Cecilia has tried buying stocks, but almost always experience losing money. A friend told her about Huddlestock and she downloaded it on her tablet. |
| Technical and system based Assumptions: | Device: Mobile Phone Application: App (iOS) Target System: Huddlestock Crowdtrading Technology Required details: Accessing Huddlestock Login to register Trading Yes/No Receipt of trade Login to learn and understand | Device: Tablet Application: App (Android) Target System: Huddlestock Crowdtrading Technology Required details: Accessing Huddlestock Login to register Trading Yes/No Receipt of trade Login to learn and understand |
| Step. 1: | Joey downloads the application and registers his login information. The system saves his information and gives access to the Huddlestock technology | Cecilia downloads the application and registers his login information. The system saves his information and gives access to the Huddlestock technology |
| 2.0 + 2.1 + 2.2 + 3.0 + 3.1 + 3.2 + 4.0 + 4.1 + 5 + 6. COMMUNICATION WITH THE TRADING SYSTEM | Login details are sent to a server, through a gateway (telecom service vendor) and the connected carrier. Contextual information retrieved from Joey's Mobile phone and the SMS application is; Login information: Email, name and birthdate. Local date ($22^{nd}$ of October) Local Time (11:34) Application/Interface (Android or iOs) Joey's Mobile phone number (+1 555 666 7777) GPS coordinates of Joey (to attach relevant trading strategy) | When the registration details are submitted it is sent to a server through the Internet. Contextual information retrieved from Cecilia tablet is; Cecilia's authentication details: ceci@company.com (She is already authenticated as she has registered before.) Local date ($22^{nd}$ of October) Local Time (11:34) Application/Interface (Android or iOs) IP address (to attach to relevant trading strategy). |

| | Real life application | |
|---|---|---|
| | Example/Scenario 1 | Example/Scenario 2 |
| 2.0 + 2.1 + 2.2 INFORMATION BASED IDENTIFICATION SYSTEM | Information provided by Joey: Birthdate, name, phone number, GPS coordinates and bankcard are being checked with database to be accurate. HCT checks if bankcard information is similar to name and birthdate given, in addition to phone number and GPS coordinates. Irregularities sends alert to the database for follow-up on security concerns. | Registration data and IP number are checked to detect irregularities. Additional security features are been developed: This includes a SMS from HCT to the user, to verify that one is trading through the system. User also needs authenticate each trade through unique designated PIN code. Irregularities sends alert to the database for follow-up on security concerns. |
| 3.0 + 3.1 + 3.2. ASSEMBLE CONTEXTUAL DATA AND INITIATE TRADING | First, the local contextual information is stored in the database (9). It is determined that: The user is Joey. Joey's GPS indicates that he is in Tokyo. Joey is assigned default trading strategy and stock exchange settings based on his geographical location. Joey's default setting is a "Low" risk profile. Joey starts trading. Joey checks his balance and trade amounts in his settings (3.2) All retrieved data is assembled and passed on to the database platform. | First, the local contextual information is stored in the database (9). It is determined that: The user is Cecilia Based on usage history, HCT knows Cecilia trades with risk profile "Medium", and that she prefers 6 trading windows each day. Cecilia is also trading from 8-16 GMT, and at two stock exchanges: OSEBX and LSE. Cecilia decides she wants to increase her risk profile. She changes from "Medium" to "High". She also places higher trades, from 200 NOK to 500 NOK per trade. All retrieved data is assembled and passed on to the database platform. |
| 4. TRADING: TO TRADE OR NOT TO TRADE | Information from steps 10 + 11 + 12 + 13 + 14 + 15 + 16 are aggregated and sent to the Data base platform. Database communicates with the user. | Information from steps 10 + 11 + 12 + 13 + 14 + 15 + 16 are aggregated and sent to the Data base platform. Database communicates with the user |
| 4.1 AUTHENTICATION OF THE USER | Based on information and checks at 2 + 3, access to a five-digit pin code is given. Joey has his pin code in his wallet and is able to trade. | Cecilia has her five-digit pin code stored in her cell phone. She uses the pin-code to gain access to the trade. |
| 4.0-4.1 DOES system ALLOW ANONYMOUS USERS? | No | No |

The apparatus and system disclosed herein may be used for instance in so-called "high-frequency trading" (HFT), but also in other trading systems for trading financial instruments.

Throughout this disclosure, conventional terms that have been considered to be well-known to the skilled person have been used for a better understanding. Thus, only terms considered to require an explanation have been explained in more detail, often by means of concrete examples.

In the drawings and specification, there have been disclosed typical embodiments and, although specific terms are employed, they are used in a generic and descriptive sense only and not for purposes of limitation, the scope of the invention being set forth in the following claims.

The invention claimed is:

1. A system for proprietary trading financial instruments in a financial trading system, the system comprising:
a computer server system with associated memory, comprising:
a monitoring unit configured to automatically monitor opportunities to perform proprietary trading in said trading system based on a plurality of systematic strategies running over a plurality of trading agents and a plurality of financial instruments based on behavioral patterns emerged by interaction of individual long- or medium-term trading, and
an automated trading unit configured to automatically control multi-agent trading of the plurality of trading agents and the plurality of financial instruments, wherein the trading unit is configured, on the basis of the opportunities monitored by the monitoring unit, to automatically provide a time frame within which a crowd of client devices are offered to trade collectively, to communicate an offer to trade collectively to the crowd of client devices, to receive from the crowd of client devices responses to the offer to trade collectively, and to carry out a collective trade based on the responses to the offer to trade collectively, founding the trade collectively and automatically based on the behavioral patterns.

2. The system according to claim 1, wherein the monitoring unit and/or automated trading unit include a data base platform which is scalable.

3. The system according to claim 1, configured to provide an approval process for client accounts respectively associated with the client devices.

4. The system according to claim 1, configured to push a notification to a set of client devices for offering a trade.

5. The system according to claim 1, further comprising the crowd of client devices, each client device having installed thereon an application program, the application program comprising client computer specific log-in information, and an interface for communication with the crowd of client devices.

* * * * *